(12) United States Patent
Miyake et al.

(10) Patent No.: US 9,950,379 B2
(45) Date of Patent: Apr. 24, 2018

(54) WIRE ELECTRIC DISCHARGE MACHINING APPARATUS

(75) Inventors: Hidetaka Miyake, Tokyo (JP); Tatsushi Sato, Tokyo (JP); Kazuhiko Fukushima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 704 days.

(21) Appl. No.: 13/498,013

(22) PCT Filed: Jun. 23, 2010

(86) PCT No.: PCT/JP2010/060686
§ 371 (c)(1),
(2), (4) Date: Mar. 23, 2012

(87) PCT Pub. No.: WO2011/036924
PCT Pub. Date: Mar. 31, 2011

(65) Prior Publication Data
US 2012/0217224 A1    Aug. 30, 2012

(30) Foreign Application Priority Data

Sep. 24, 2009 (JP) ................................. 2009-219159
Apr. 2, 2010 (JP) ................................. 2010-086201

(51) Int. Cl.
*B23H 7/10* (2006.01)
*B23H 1/02* (2006.01)
(Continued)

(52) U.S. Cl.
CPC .............. *B23H 1/028* (2013.01); *B23H 7/02* (2013.01); *B23H 7/101* (2013.01); *B23H 7/107* (2013.01); *B23H 9/00* (2013.01); *B23H 11/006* (2013.01)

(58) Field of Classification Search
CPC .......... B23H 7/102; B23H 7/101; B23H 7/10; B23H 11/006; B23H 1/028; B23H 7/02; B23H 7/107; B23H 9/00
(Continued)

(56) References Cited

U.S. PATENT DOCUMENTS 4,193,852 A    3/1980 Inoue
4,475,996 A *  10/1984 Inoue ..................... B23H 7/08
                                                204/224 M
(Continued)

FOREIGN PATENT DOCUMENTS

GB    2103138 A *  2/1983
JP    54 20485      2/1979
(Continued)

OTHER PUBLICATIONS

International Search Report dated Jul. 27, 2010 in PCT/JP10/60686 Filed Jun. 23, 2010.
(Continued)

*Primary Examiner* — Tu B Hoang
*Assistant Examiner* — Diallo I Duniver
(74) *Attorney, Agent, or Firm* — Oblon, McClelland, Maier & Neustadt, L.L.P.

(57) ABSTRACT

A wire electric discharge machining apparatus is constructed in such a manner as to include: a wire electrode having a plurality of cutting wire portions that are separated from one another in parallel and are opposed to a workpiece; a machining power supply that generates a pulsed machining voltage; a plurality of power feed contact units that are electrically connected to the cutting wire portions and apply the machining voltage between the cutting wire portions and the workpiece; and a nozzle that ejects machining liquid from an ejection opening toward an electrode gap along the cutting wire portions.

4 Claims, 11 Drawing Sheets

(51) Int. Cl.
  *B23H 7/02* (2006.01)
  *B23H 9/00* (2006.01)
  *B23H 11/00* (2006.01)

(58) Field of Classification Search
  USPC ..... 219/69.12, 69.14, 69.17; 226/97.1, 94.4; 125/16.01, 16.02, 16, 18, 21; 451/5, 9, 451/18, 49
  See application file for complete search history.

(56) References Cited

U.S. PATENT DOCUMENTS

| | | | | |
|---|---|---|---|---|
| 4,507,532 | A * | 3/1985 | Inoue | 219/69.12 |
| 4,575,603 | A * | 3/1986 | Inoue | B23H 7/101 |
| | | | | 204/206 |
| 4,655,191 | A * | 4/1987 | Wells | B23D 57/0069 |
| | | | | 125/16.01 |
| 4,803,326 | A * | 2/1989 | Kiyoshi | B23H 7/10 |
| | | | | 204/206 |
| 6,774,334 | B1 * | 8/2004 | Kobayashi | B23H 7/065 |
| | | | | 219/69.12 |
| 2011/0092053 | A1 | 4/2011 | Miyake et al. | |

FOREIGN PATENT DOCUMENTS

| | | | |
|---|---|---|---|
| JP | 57 121420 | 7/1982 | |
| JP | 61 260928 | 11/1986 | |
| JP | 63 120025 | 5/1988 | |
| JP | 64 58469 | 3/1989 | |
| JP | 5 96461 | 4/1993 | |
| JP | 11 226858 | 8/1999 | |
| JP | 2000 94221 | 4/2000 | |
| JP | 2002 11619 | 1/2002 | |
| JP | 2004 186589 | 7/2004 | |
| JP | 2006 123055 | 5/2006 | |
| JP | 2009 137000 | 6/2009 | |
| WO | WO 2008092135 A2 * | 7/2008 | ............. B23H 1/028 |

OTHER PUBLICATIONS

U.S. Appl. No. 12/999,106, filed Dec. 15, 2010, now U.S. Pat. No. 2011-0092053, Miyake, et al.

U.S. Appl. No. 14/702,409, filed May 1, 2015, Miyake, et al.

* cited by examiner

WIRE ELECTRIC DISCHARGE MACHINING APPARATUS

FIELD

The present invention relates to a wire electric discharge machining apparatus that winds a wire electrode around a plurality of guide rollers, thereby arranging the wire electrode in parallel to each other, and that generates electric discharge between the parallel wire electrodes and a workpiece, thereby cutting the workpiece into a plurality of board-like members at a time.

BACKGROUND

Patent Literature 1 proposes that, when a columnar workpiece is sliced into thin boards by wire electric discharge machining, one wire electrode is wound around a plurality of guide rollers to be arranged in parallel to each other, thereby forming a large number of cutting wire portions, a voltage is fed to the cutting wire portions individually, and electric discharge is generated between the cutting wire portions and the workpiece at the same time, so that the productivity of the slice machining of the workpiece is improved.

According to an electric discharge wire saw of the configuration described above, when the machining advances and a machined groove formed in a workpiece becomes deeper, it gradually becomes difficult to discharge machining chips from the machined groove, and the machining chips remain in the machined groove. If the machining chips remain in the machined groove, the frequency of electric discharge from cutting wires to the machining chips becomes high, electric discharge in a machining direction is reduced and thus the machining speed is reduced. Furthermore, when electric discharge in a groove-width direction is increased, the width of the machined groove is increased, and it becomes difficult to reduce a slice pitch. Further, the probability of wire breakage of the cutting wire increases, and a machining surface is easily damaged due to the breakage of the cutting wire. Even when the disconnected portions of the wire are tied to each other and machining can be resumed, because a removed amount is large at the portion of the wire breakage, there is a problem that a member having its slicing being completed needs to be additionally subjected to a grinding process including a damaged region of the disconnected portion, and a needless time for machining and loss of members occur. Therefore, Patent Literature 2 discloses a technique in which machining liquid is sprayed to a machined portion by using a nozzle, machining chips generated during the machining are discharged outside from the machined groove so that the machining chips do not remain in an electrode gap. Patent Literature 3 discloses a technique for supplying machining liquid to machined grooves.

CITATION LIST

Patent Literatures

Patent Literature 1: Japanese Patent Application Laid-open No. 2000-94221
Patent Literature 2: Japanese Patent Application Laid-open No. S54-20485
Patent Literature 3: Japanese Patent Application Laid-open No. H05-96461
Non Patent Literature

SUMMARY

Technical Problem

However, the technique disclosed in Patent Literature 2 has a problem that as a machining process advances and the machined groove becomes deeper, it becomes difficult to supply machining liquid to a tip end of a slit, and thus the discharging ability of machining chips is degraded. Further, there is also a problem that when an ejecting pressure of machining liquid is increased to supply the machining liquid to the tip end of the machined groove, because a machining liquid pressure is locally applied to the cutting wire, the cutting wire is sagged, and the machining precision is lowered. Also, there is a problem that a wire electrode is pushed against a cutting wire machining surface due to the sagging of the cutting wire, and thus the probability of the wire electrode being short-circuited increases. The technique disclosed in Patent Literature 3 is for supplying machining liquid including abrasive grain to a machined groove, and this technique does not solve the problem of discharging machining chips.

The present invention has been achieved in view of the above problems, and an object of the present invention to is provide a wire electric discharge machining apparatus, a wire electric discharge machining method, a thin board manufacturing method, and a semiconductor wafer manufacturing method that are capable of suppressing degradation in the machining precision and the machining speed.

Solution to Problem

In order to solve the aforementioned problems, a wire electric discharge machining apparatus according to one aspect of the present invention is constructed in such a manner as to include: a wire electrode having a plurality of cutting wire portions that are separated from each other in parallel and are opposed to a workpiece; a machining power supply that generates a pulsed machining voltage; a plurality of power feed contact units that are electrically connected to the cutting wire portions and apply the machining voltage between the cutting wire portions and the workpiece; and a nozzle that ejects machining liquid from an ejection opening toward an electrode gap along the cutting wire portions.

Advantageous Effects of Invention

According to the present invention, it becomes easy to equalize the machining pressure applied to a plurality of cutting wire portions arranged in parallel, and thus it is possible to suppress sagging of the wire electrode. In addition, because machining liquid can be stably supplied to an electrode gap, machining chips can be easily discharged from a workpiece and the electrode gap. According to this configuration, it is possible to suppress degradation in the machining precision and the machining speed.

DESCRIPTION OF EMBODIMENTS

Exemplary embodiments of a wire electric discharge machining apparatus according to the present invention will be explained below in detail with reference to the accompanying drawings. The present invention is not limited to the embodiments.

First Embodiment

Figure 1:
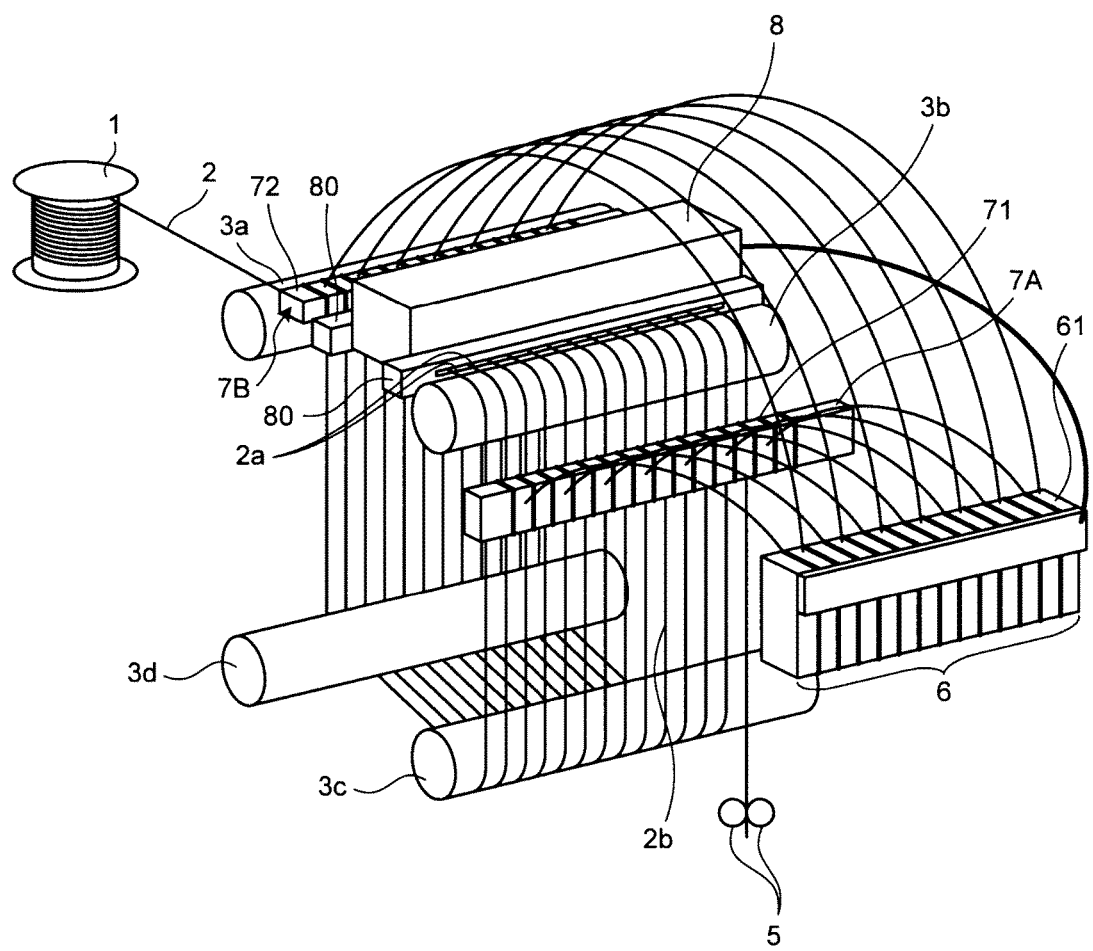
FIG. 1 is a perspective view of a wire electric discharge machining apparatus according to a first embodiment.

Configurations and operations according to embodiments of the present invention are explained below. FIG. 1 is a perspective view of a wire electric discharge machining apparatus according to a first embodiment. In the wire electric discharge machining apparatus according to the first embodiment, one wire electrode 2 unreeled from a wire bobbin 1 is sequentially wound for many times around a plurality of guide rollers 3a to 3d at a slight distance from each other, and a plurality of cutting wire portions 2a are formed. That is, the wire electrode 2 includes a plurality of cutting wire portions 2a. The total distance of gaps between the cutting wire portions 2a formed by winding the wire electrode 2 becomes the machining width (thicknesses) of a workpiece 8 to be machined. That is, in a state where a certain workpiece 8 is set opposing to the cutting wire portions 2a at a predetermined distance, by sending the workpiece 8 toward the cutting wire portions 2a while applying a voltage between the cutting wire portions 2a and the workpiece 8, the workpiece 8 is cut by the cutting wire portions 2a. According to this configuration, the workpiece 8 is processed into a plurality of thin boards. The workpiece 8 is a material to be sliced into a plurality of thin boards, and examples of the workpiece 8 include metal such as tungsten and molybdenum that become sputtering targets, ceramic such as polycrystalline silicon carbide used as various structural members, a semiconductor material such as at least one of monocrystalline silicon and monocrystalline silicon carbide that become semiconductor device wafers, and a solar battery material such as monocrystalline and polycrystalline silicon that become solar battery wafers. The semiconductor material can be made of a material having at least one of silicon and silicon carbide as the main component thereof. FIG. 1 depicts that one wire electrode 2 is wound around the guide rollers as an example, but the present invention is not limited thereto, and when a plurality of cutting wire portions are formed by folding back one wire electrode 2, the specific configuration thereof is not particularly limited.

In the first embodiment, the guide rollers 3a to 3d are arranged such that they are separated from each other in parallel to the axial direction thereof. The guide rollers 3a and 3b are provided at the highest position, the guide roller 3c is provided at the lowest position below the guide roller 3b, and the guide roller 3d is provided below the guide roller 3a in a side-by-side state with the guide roller 3c.

After the wire electrode 2 is wound for a predetermined number of times, it is discharged by wire discharge rollers 5. A portion of the wire electrode 2 between the guide roller 3a and the guide roller 3b can be opposed to the workpiece 8 and become the cutting wire portions 2a that machine the workpiece 8. As shown in FIG. 1, the workpiece 8 is set opposing to the cutting wire portions 2a with a slight distance therebetween, and an electric discharge machining process is performed. Portions of the wire electrode 2 between the guide roller 3b and the guide roller 3c are feed wire portions 2b to which a voltage (a machining voltage) for performing electric discharge machining is fed.

A voltage (a machining voltage) for performing electric discharge machining is fed from a machining power supply 6 to the feed wire portions 2b of the wire electrode 2 by way of power feed contacts 7A and 7B, and a voltage is applied between the feed wire portions 2b and the workpiece 8. The machining power supply 6 includes a plurality of machining power supply units 61 that can independently apply the voltage. The power feed contacts 7A and 7B also respectively include a plurality of power feed contact units 71 and 72 that are insulated from each other, and the power feed contacts 7A and 7B can independently apply the voltage to the cutting wire portions 2a. The machining power supply units 61 that can independently apply the voltage to the parallel wire electrodes are connected to a control device (not shown) of the wire electric discharge machining apparatus.

Of course, like the conventional wire electric discharge machining, the polarity of an applied voltage can be appropriately reversed as needed. The position of the workpiece 8 is controlled by a position control device (not shown) such that the workpiece 8 is separated from the wire electrode 2 wound around the guide rollers 3a to 3d with a slight distance therebetween. Therefore, an appropriate electric discharge gap length is maintained. Machining liquid (not shown) is supplied between the workpiece 8 and the wire electrode 2 by spraying or immersing, just as a common wire electric discharge machining.

Figure 2:
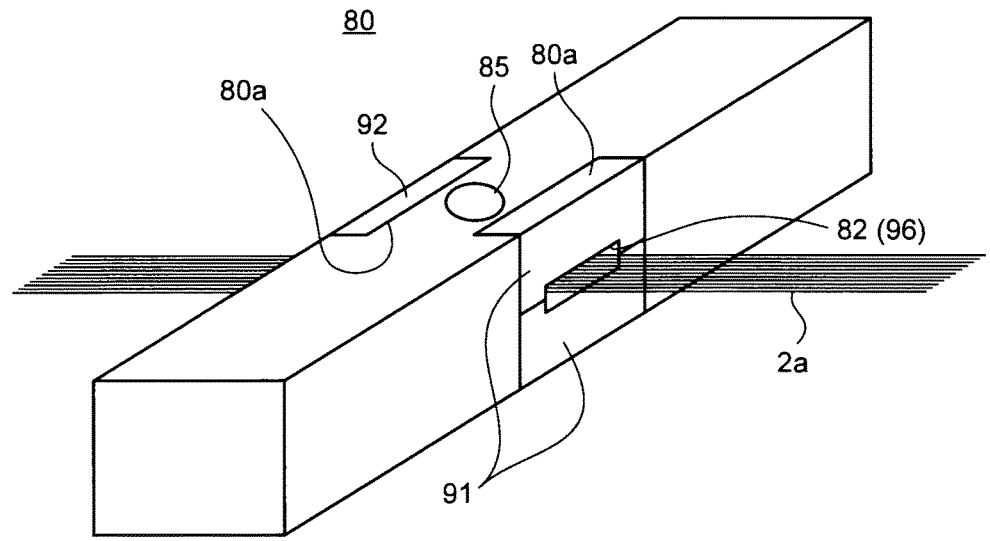
FIG. 2 is a perspective view of a schematic configuration of a nozzle.
Figure 3:
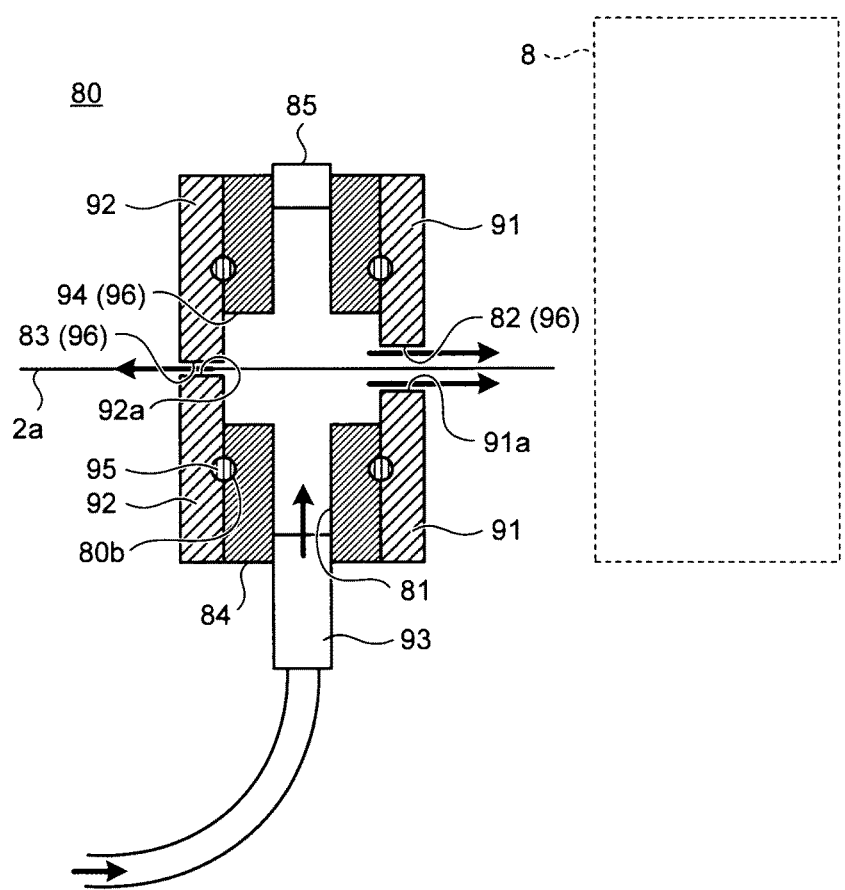
FIG. 3 is a side sectional view of the nozzle.
Figure 4:
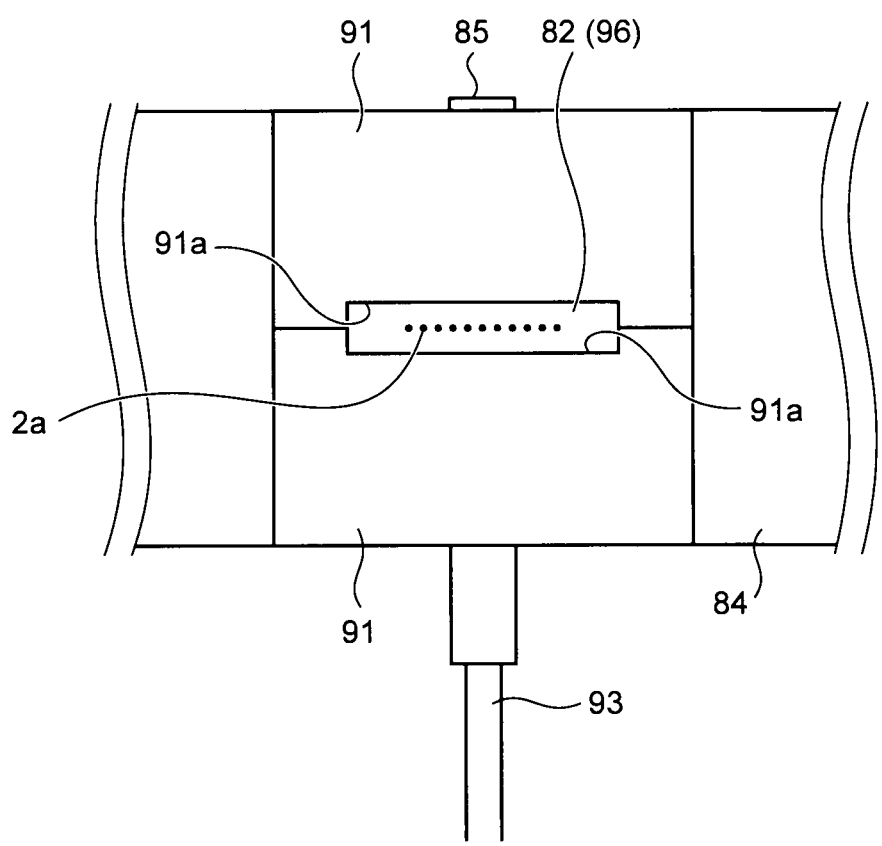
FIG. 4 is a front view of the nozzle as viewed from an ejection opening.

FIG. 2 is a perspective view of a schematic configuration of a nozzle 80. FIG. 3 is a side sectional view of the nozzle 80. FIG. 4 is a front view of the nozzle 80 as viewed from an ejection opening 82. The nozzle 80 ejects machining liquid and supplies the machining liquid between the workpiece 8 and the wire electrode 2. A through hole 96 is formed in the nozzle 80 and the cutting wire portions 2a penetrate the through hole 96. The nozzle 80 is arranged on each of the both sides of the workpiece 8 in a state where the cutting wire portions 2a have penetrated the through hole 96.

Each of the nozzles 80 includes a body 84, ejection opening configuring board 91, and outlet configuring board 92. A pipe connecting hole 81 is formed in the body 84, and machining liquid is supplied through the pipe connecting hole 81. The pipe connecting hole 81 penetrates the body 84, and one side of the pipe connecting hole 81 is closed with a plug 85. A supply pipe 93 for supplying machining liquid is connected to the other side of the pipe connecting hole 81 that penetrates the body 84. The side closed with the plug 85 and the other side connected to the supply pipe 93 can be reversed.

Recesses 80a are formed in the body 84 on an ejecting side of the machining liquid and also on a side opposite to the ejecting side. The ejection opening configuring board 91 and the outlet configuring board 92 are mounted in the recesses 80a. A wire through hole 94 is formed in the body 84 in such a manner as to connect surfaces of the body 84 where the recesses 80a are formed, and the cutting wire portions 2a pass through the wire through hole 94. The wire through hole 94 and the pipe connecting hole 81 intersect with each other in the body 84. Therefore, machining liquid supplied from the supply pipe 93 to the pipe connecting hole 81 flows toward both ends of the wire through hole 94.

Grooves 80b are formed in the recesses 80a such that the grooves 80b surround the wire through hole 94. O-rings 95 are fitted into the grooves 80b to prevent the machining liquid from leaking from the gap between the ejection opening configuring board 91, the outlet configuring board 92 and the body 84.

The ejection opening configuring board 91 is mounted in the recess 80a formed on a side of the body 84 facing the workpiece 8. The ejection opening configuring board 91 is configured by two board members, and notches 91a are formed at a position where these two board members are butted against each other when the ejection opening configuring boards 91 is mounted in the recess 80a. In a state where the two board members are butted against each other, the notches 91a formed in the ejection opening configuring board 91 function as the ejection opening 82 from which the machining liquid is ejected. The ejection opening 82 is formed such that it is superposed on the wire through hole 94 formed in the body 84.

The outlet configuring board 92 is mounted in the recess 80a on a side opposite to the ejection opening configuring board 91. The outlet configuring board 92 consists of two board members, and notches 92a are formed at a position where these two board members are butted against each other when they are mounted in the recess 80a. The notches 92a formed in the outlet configuring board 92 function as an outlet 83 from which machining liquid is discharged in a state where the two board members are butted against each other. The outlet 83 is superposed on the wire through hole 94 formed in the body 84.

In this manner, the ejection opening configuring board 91 and the outlet configuring board 92 are mounted on the body 84, and the through hole 96 whose one end is the ejection opening 82 is formed by the ejection opening 82, the wire through hole 94, and the outlet 83. Opening areas of the ejection opening 82 and the outlet 83 are smaller than an opening area of the end of the wire through hole 94. An opening area of the outlet 83 is smaller than an opening area of the ejection opening 82.

Machining liquid is supplied from the ejection opening 82 to the electrode gap, and the cutting wire portions 2a pass into the nozzle 80 through the outlet 83. A slight space is created in the body 84 at a location where the wire through hole 94 and the pipe connecting hole 81 intersect with each other. Machining liquid that flows from the pipe connecting hole 81 into the body 84 is stored in this space, a flowing direction of the machining liquid is deviated by 90°, and the machining liquid is ejected from the ejection opening 82.

The nozzles 80 are arranged such that the ejection openings 82 are adjacent to both sides of the workpiece 8. Gaps between the workpiece 8 and the ejection openings 82 of the nozzles 80 arranged on both sides of the workpiece 8 are set to 0.1 to 0.3 millimeter when tight machining can be performed. To reduce damage caused by an ejecting pressure of machining liquid, the nozzles 80 are arranged such that they are separated from the workpiece 8 by approximately 50 millimeters in some cases depending upon the type of members, a required slicing thickness of the workpiece 8 and so on. To efficiently discharge machining chips, it is preferable that a distance between the ejection openings 82 and the workpiece 8 is 50 millimeters or less.

The wire electrode 2 having the cutting wire portions 2a is inserted into one of the nozzles 80 from the outlet 83, and goes outside the nozzle 80 from the ejection opening 82. Thereafter, the wire electrode 2 is inserted into the other nozzle 80 opposed to the one nozzle 80 from the ejection opening 82 of the other nozzle 80, and goes out from the outlet 83 through the interior of the nozzle. Thereafter, the wire electrode 2 comes into contact with the power feed contact 7A and is wound around the guide rollers 3a to 3d. By repeating this process, the wire electrode 2 can have the cutting wire portions 2a arranged between the nozzles 80 in parallel to each other.

If machining liquid is supplied to the nozzle 80 in this state, the machining liquid flows into the nozzle 80 through the supply pipe 93. The machining liquid that flows into the nozzle 80 is ejected from the ejection opening 82, and is discharged from the outlet 83. It is preferable that the machining liquid that flows into the nozzle 80 is ejected only from the ejection opening 82 and is supplied to the electrode gap of the workpiece 8. However, the machining liquid is discharged also from the outlet 83 that is formed so that the wire electrode 2 passes therethrough. However, because the opening area of the outlet 83 is smaller than that of the ejection opening 82, most of machining liquid is ejected from the ejection opening 82 having a smaller flowing resistance. It suffices that the wire electrode 2 of φ0.1 millimeter can be inserted into the outlet 83, and it is preferable that the outlet 83 is formed as small as possible. If the outlet 83 is formed too small, the operability of an operation for inserting the wire electrode 2 is degraded. Therefore, a height size of the outlet 83 is preferably about 0.5 millimeter, for example. On the other hand, a height size of the ejection opening 82 is about 5 millimeters, for example. It suffices that the ejection opening 82 and the outlet 83 have such width sizes that the cutting wire portions 2a that are arranged in parallel to each other are accommodated in the openings.

Figure 5:
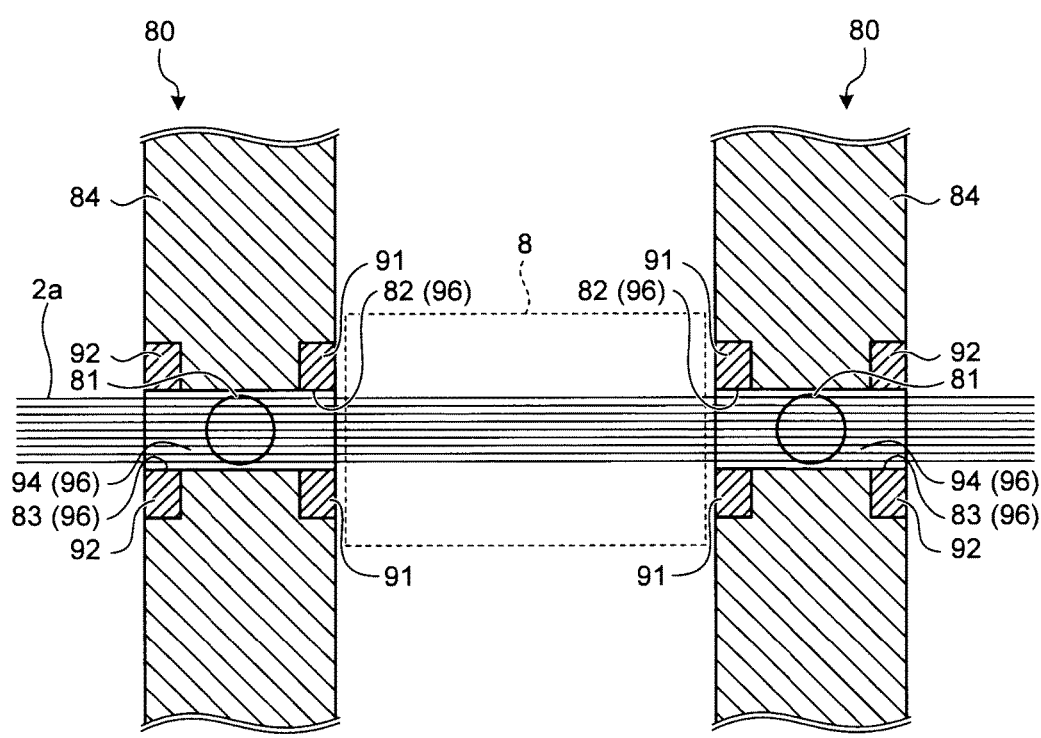
FIG. 5 is a plan sectional view of nozzles.
Figure 6:
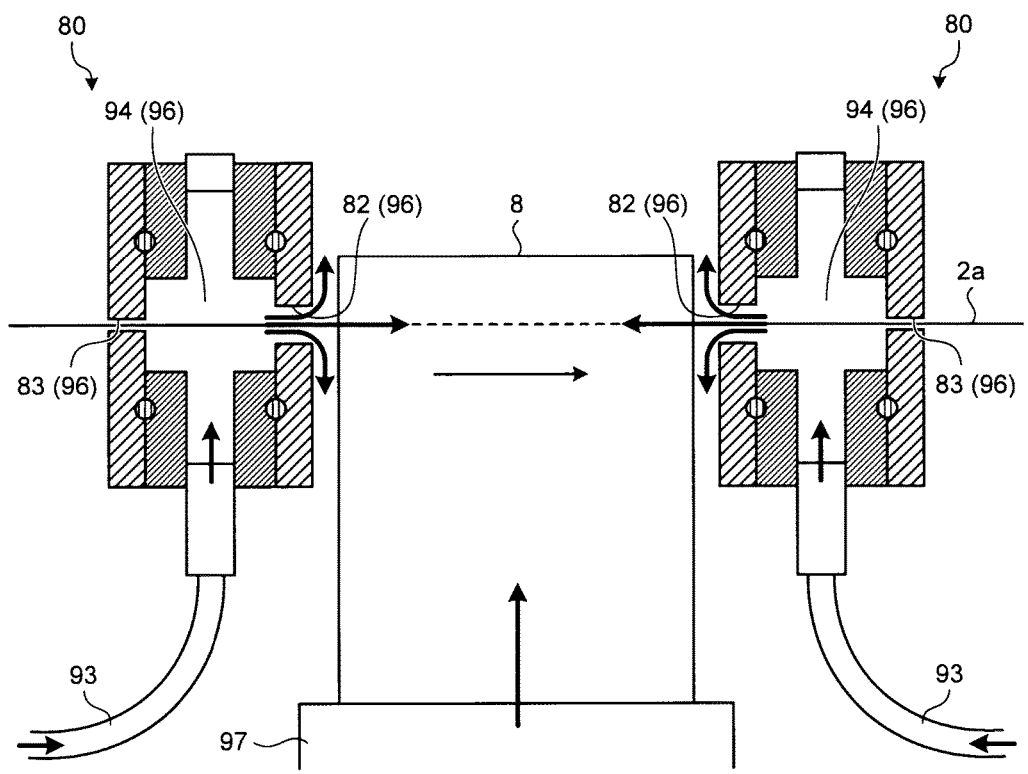
FIG. 6 is a front sectional view of the nozzles in a process of cutting a workpiece.

FIG. 5 is a plan sectional view of the nozzles 80. FIG. 6 is a front sectional view of the nozzles 80 in a process of cutting the workpiece 8. When machining liquid is supplied to the two nozzles 80, the machining liquid is ejected from the ejection openings 82 coaxially with the cutting wire portions 2a along the cutting wire portions 2a and is sprayed to the workpiece 8. When a voltage is applied while advancing the wire electrode 2 and sending a stage 97 upward, the workpiece 8 fixed to the stage 97 is moved upward. When the workpiece 8 approaches the wire electrode 2, the workpiece 8 is machined by electric discharge generated between the wire electrode 2 and the workpiece 8. Machining chips generated by the electric discharge machining are discharged from the electrode gap by machining liquid ejected from the nozzles 80.

As shown in FIG. 6, with this configuration, even when the machining advances and the machined groove becomes deeper, the ejection opening 82 of the nozzle 80 is always coaxial with the cutting wire portions 2a, and the machining liquid is ejected such that it moves toward an electrode gap along each of the cutting wire portions 2a. Therefore, it becomes easy to equalize the machining liquid pressure applied to the cutting wire portions 2a, and it is possible to suppress the sagging of the wire electrode. Further, because the machining liquid is ejected toward the electrode gap along the cutting wire portions 2a, the machining liquid can be sprayed from the nozzle 80 to the tip end of the machined groove of the machining process at any point of time, and it is possible to stably supply the machining liquid to the electrode gap. According to this configuration, it is possible to easily discharge the machining chips from the machined groove stably, irrespective of the depth of the machined groove. As a result, electric discharge in the machining direction is increased and reduction in the machining speed can be suppressed. In addition, it becomes possible to easily and equally thin the machined grooves of the workpiece 8 that are cut at a time by the parallel cutting wire portions 2a and therefore, the degradation in the machining precision can be suppressed. Because the cutting wire portions 2a penetrate the through hole 96 whose one end is the ejection opening 82, the machining liquid ejected from the ejection opening 82 can be easily ejected along the cutting wire portions 2a, it is possible to more reliably spray the machining liquid to the tip end of the machined groove.

When a semiconductor material such as at least one of monocrystalline silicon and monocrystalline silicon carbide, a solar battery material such as monocrystalline and polycrystalline silicon, ceramic such as polycrystalline silicon carbide, and a sputtering target material such as tungsten and molybdenum is machined by the wire electric discharge machining method, the machining speed is increased and the width of the machined groove can be narrowed, and thus it is possible to obtain many members from one ingot. Furthermore, it is possible to cut out a plurality of thin boards at a time with high precision in size.

The ejection opening 82 and the outlet 83 whose opening areas cannot be increased so much are formed respectively by the ejection opening configuring board 91 and the outlet configuring board 92. Therefore, the wire through hole 94 formed in the body 84 can be formed larger than the ejection opening 82 and the outlet 83. According to this configuration, it is possible to enhance the operability in inserting the wire electrode 2 into the wire through hole 94. The ejection opening configuring board 91 and the outlet configuring board 92 are formed by the butted portions of the two board members. Therefore, after the wire electrode 2 is made to pass through the body 84, if the two board members configuring the ejection opening configuring board 91 and the outlet configuring board 92 are mounted in such a manner as to sandwich the wire electrode 2, it is possible to easily form the ejection opening 82 and the outlet 83.

Second Embodiment

Figure 7:
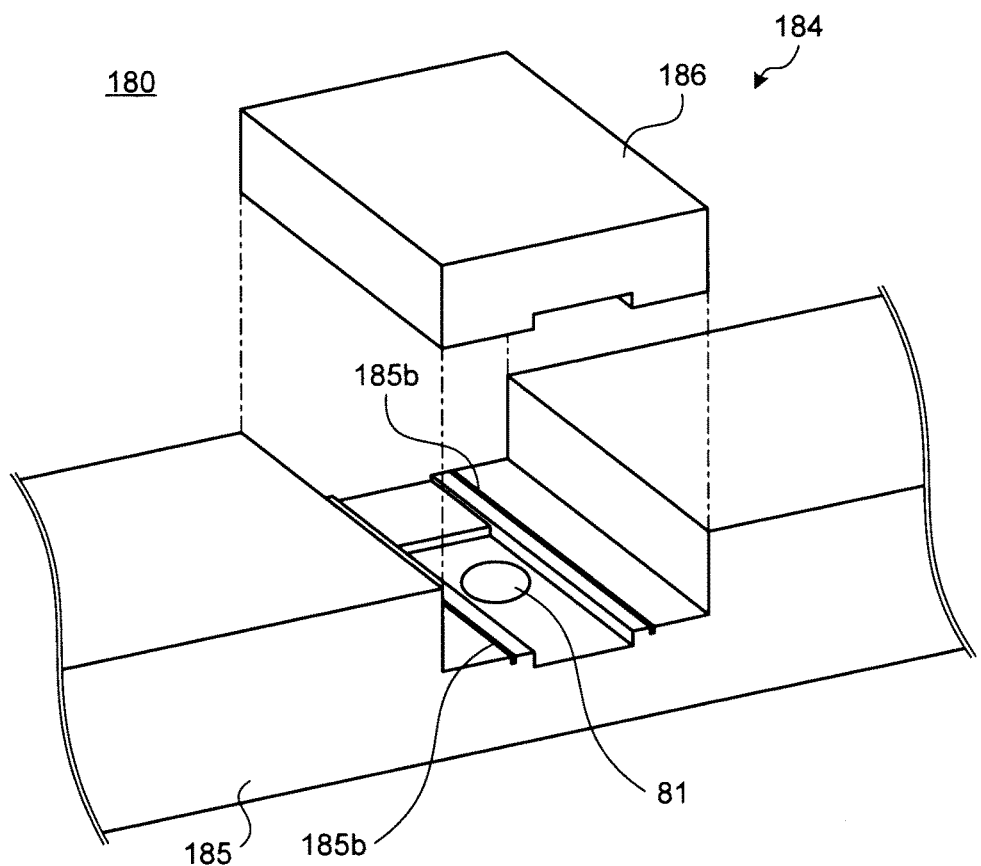
FIG. 7 is a partially enlarged perspective view of a nozzle included in a wire electric discharge machining apparatus according to a second embodiment.
Figure 8:
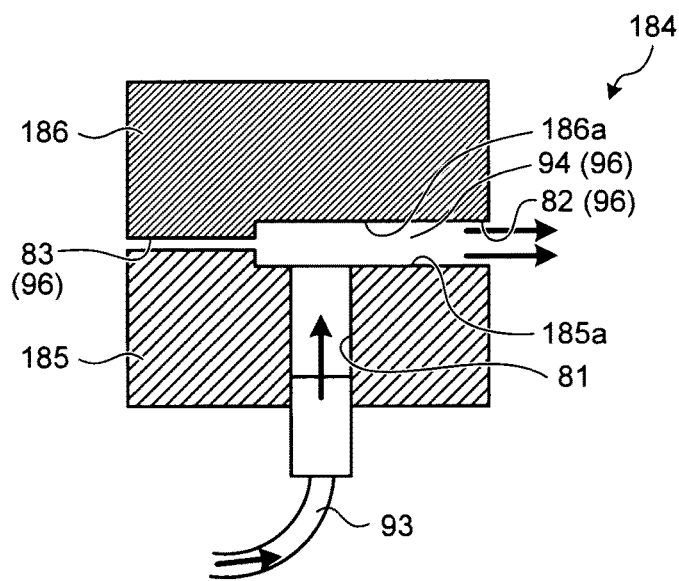
FIG. 8 is a side sectional view of the nozzle shown in FIG. 7.

FIG. 7 is a partially enlarged perspective view of a nozzle 180 provided in a wire electric discharge machining apparatus according to a second embodiment. FIG. 8 is a side sectional view of the nozzle 180 shown in FIG. 7. Constituent elements identical to those of the first embodiment are denoted by like reference signs and explanations thereof will be omitted. In the second embodiment, a nozzle configuration is modified to facilitate an inserting operation of the wire electrode 2 (the cutting wire portions 2a).

The second embodiment employs such a structure that a body 184 can be separated in a direction substantially perpendicular to the penetrating direction of the wire electrode 2 and the parallel direction thereof, in a manner sandwiching the through hole 96 (the ejection opening 82, the wire through hole 94, and the outlet 83). More specifically, as shown in FIGS. 7 and 8, the body 184 includes a base 185 to which the supply pipe 93 is connected, and a lid 186 that can be vertically separated from the base 185. That is, the base 185 and the lid 186 can be separated from each other, having the through hole 96 therebetween. A space formed between the base 185 and the 186 in a state where the lid 186 is mounted on the base 185 becomes the wire through hole 94. A stepped portion is provided between opposed surfaces 185a and 186a respectively of the base 185 and the lid 186. According to this configuration, an opening area of the outlet 83 can be made smaller than that of the ejection opening 82.

As described above, because the body 184 can be vertically separated from the wire through hole 94, when the lid 186 is removed, it is possible to open a portion (the through hole 96) of the base 185 through which the cutting wire portions 2a are supposed to pass (to be arranged). Therefore, if, after the wire electrode 2 (the cutting wire portions 2a) is inserted (arranged) in a state where the base 185 is set on the machining apparatus, the lid 186 is mounted (combined with) on the base 185, the inserting operation is completed. Therefore, the inserting operation of the cutting wire portions 2a is further facilitated. As a sealing for preventing a leakage of liquid from a gap between the base 185 and the lid 186, it suffices that a rod-like sealing rubber (not shown) is fitted into a groove 185b that is formed in parallel to an inserting direction of the wire electrode 2. Even when the cross sectional area of the wire through hole 94 is made small, if the lid 186 is removed, the inserting operation of the cutting wire portions 2a can be easily performed. Therefore, the inserting operation can be facilitated without using the ejection opening configuring board 91 and the outlet configuring board 92. According to this configuration, it is possible to reduce the number of parts and the number of steps. The ejection opening configuring board 91 and the outlet configuring board 92 can be used like the first embodiment.

Because the inserting operation of the cutting wire portions 2a is facilitated, it is easy to increase the number of winding times of the wire electrode 2, and increase the number of parallel lines of the cutting wire portions 2a. Even when the number of parallel lines of the cutting wire portions 2a is increased, it is unnecessary to insert the wire electrode 2 (the cutting wire portions 2a) into the wire through hole 94 one by one. Therefore, it is possible to reduce the time and labor required for a setup operation.

When a semiconductor material such as at least one of monocrystalline silicon and monocrystalline silicon carbide, a solar battery material such as monocrystalline and polycrystalline silicon, ceramic such as polycrystalline silicon carbide, and a sputtering target material such as tungsten and molybdenum is machined by the aforementioned wire electric discharge machining method, the machining speed is increased and the width of the machined groove can be narrowed, and thus it is possible to obtain many members from one ingot. Furthermore, it is possible to cut out a plurality of thin boards at a time with high precision in size.

Third Embodiment

Figure 9:
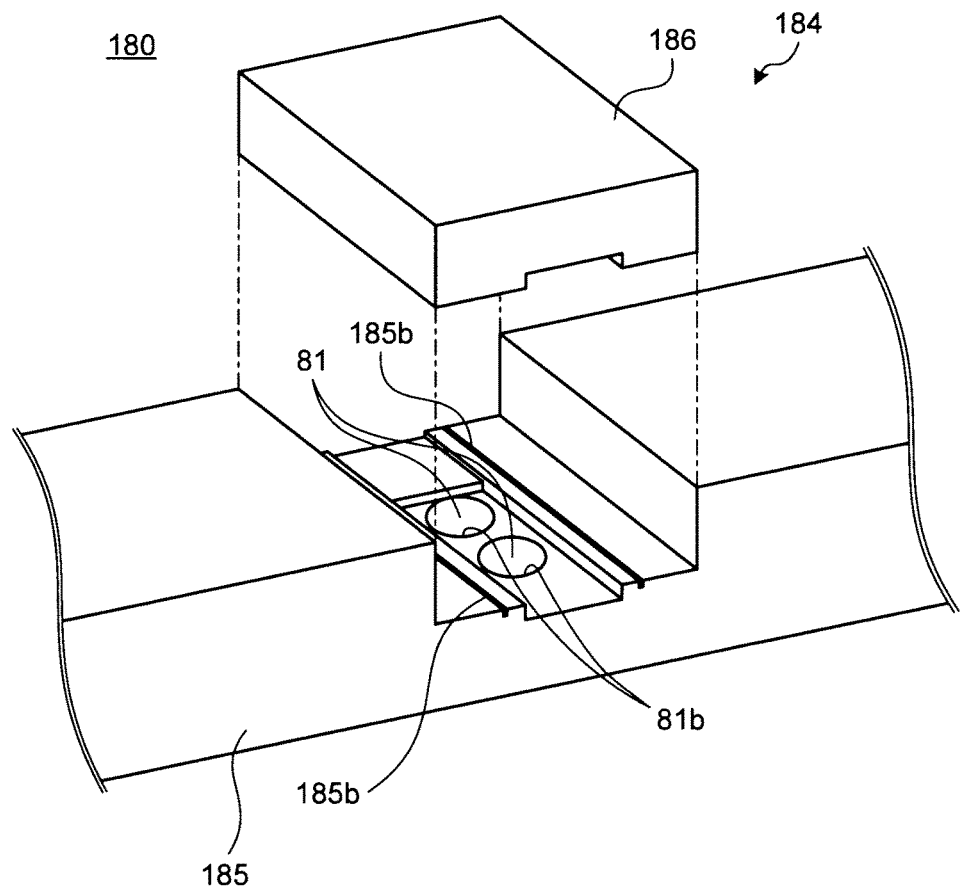
FIG. 9 is a partially enlarged perspective view of a nozzle included in a wire electric discharge machining apparatus according to a third embodiment.
Figure 10:
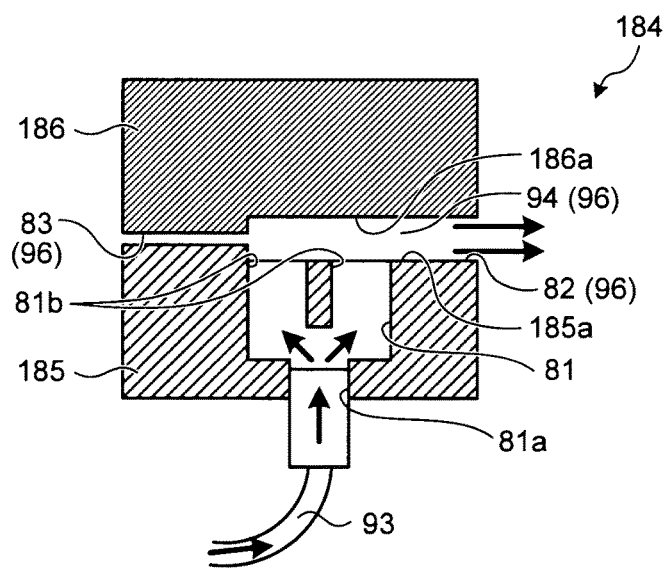
FIG. 10 is a side sectional view of the nozzle shown in FIG. 9.

FIG. 9 is a partially enlarged perspective view of the nozzle 180 provided in a wire electric discharge machining apparatus according to a third embodiment. FIG. 10 is a side sectional view of the nozzle 180 shown in FIG. 9. Constituent elements identical to those of the first embodiment are denoted by like reference signs and explanations thereof will be omitted.

In the first embodiment described above, the number of the pipe connecting hole 81 is only one, and machining liquid flows into the body 184 from the pipe connecting hole 81. The pipe connecting hole 81 is formed at a center of the body 184, and the parallel cutting wire portions 2a pass directly above the pipe connecting hole 81. When the number of parallel lines of the cutting wire portions 2a is increased or distances between the parallel lines are narrowed, some of the cutting wire portions 2a are sagged in some cases by a machining liquid pressure applied from the pipe connecting hole 81. When an end surface of the workpiece 8 is subjected to chamfering machining in this state, if, for example, the number of the cutting wire portions 2a is 20, electric discharge is first started from both ends of the cutting wire portions 2a, and electric discharge is gradually generated toward inner-side cutting wire portions 2a. Therefore, the advancing degree of the machining process differs depending on the position of the workpiece 8, and the timing for cutting the workpiece 8 is varied. If the cutting timing is varied, the machining becomes unstable and the possibility of a wire being disconnected becomes high. That is, to stabilize the cutting machining process of the workpiece 8 when the number of parallel lines of the cutting wire portion 2a is large, it is important to suppress variations in the machining advancing degree which is variable depending on the position of the workpiece 8.

The third embodiment employs a configuration that a pressure of machining liquid when it flows into the nozzle 180 is dispersed so that the parallel cutting wire portions 2a are not sagged by the machining liquid.

In the third embodiment, the pipe connecting hole 81 is branched off into two flow paths in its halfway. Because the pipe connecting hole 81 is branched off into the two flow paths, an area an exit 81b of the pipe connecting hole 81 is greater than that of an inlet 81a. That is, in the nozzle 180, a cross sectional area of a flow path through which machining liquid that has flowed into the nozzle 180 through the through hole 96 within the nozzle 180 is greater than that of a flow path through which machining liquid flows into the nozzle 180 through the supply pipe 93. According to this configuration, the flowing speed of the machining liquid flowing into the body 184 can be reduced. By reducing the flowing speed of the machining liquid, it is possible to reduce a machining liquid pressure applied to the cutting wire portions 2a. According to this configuration, it is possible to suppress the sagging of the cutting wire portions 2a and to suppress variations in the machining advancing degree. By suppressing variations in the machining advancing degree, it is possible to lower the risk of disconnection of the wire electrode 2 and to stably machine the workpiece 8.

Figure 11:
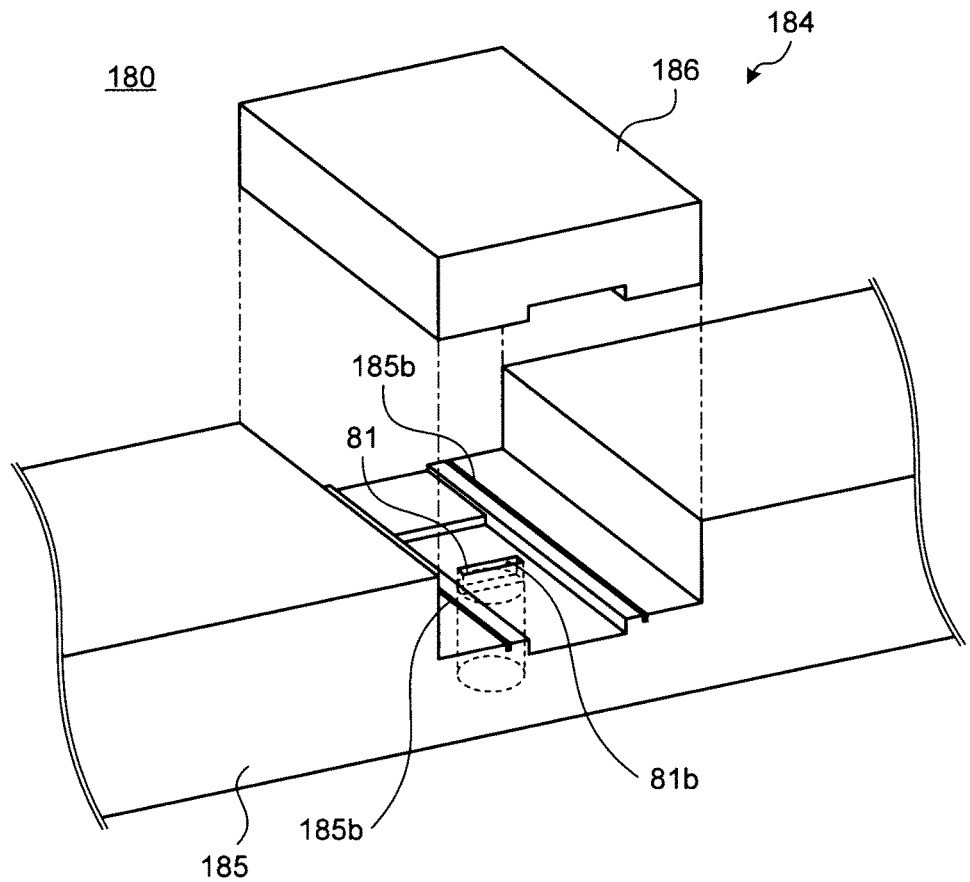
FIG. 11 is a partially enlarged perspective view of a nozzle according to a modification of the third embodiment.
Figure 12:
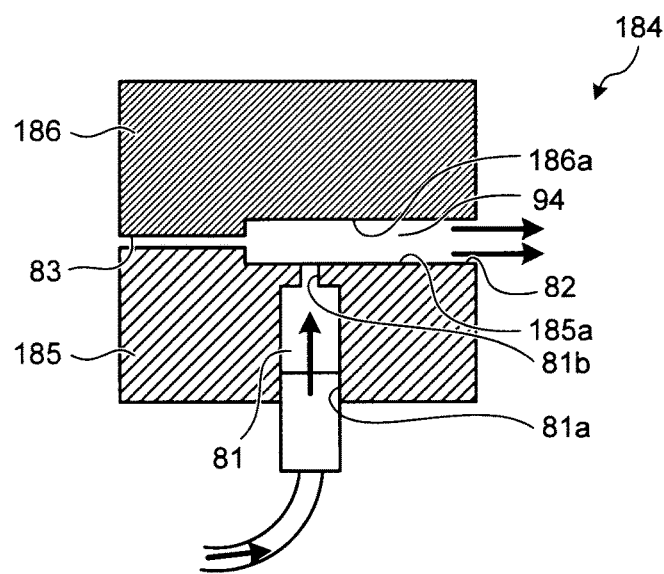
FIG. 12 is a side sectional view of the nozzle shown in FIG. 11.

FIG. 11 is a partially enlarged perspective view of the nozzle 180 according to a modification of the third embodiment. FIG. 12 is a side sectional view of the nozzle 180 shown in FIG. 11. In this modification, the shape of a hole of the exit 81b of the pipe connecting hole 81 is made a rectangular shape having a width size that is substantially equal to the width of the parallel lines of the cutting wire portions so that a machining liquid pressure is applied to the cutting wire portions 2a in the entire parallel direction and the sagging of the cutting wire portions 2a is thus substantially equalized. According to this configuration, it is possible to suppress variations in the machining advancing degree of the workpiece 8, to reduce the risk of disconnection of the wire electrode 2, and to stably machine the workpiece 8.

When a semiconductor material such as at least one of monocrystalline silicon and monocrystalline silicon carbide, a solar battery material such as monocrystalline and polycrystalline silicon, ceramic such as polycrystalline silicon carbide, and a sputtering target material such as tungsten and molybdenum is machined by the wire electric discharge machining method, an electromagnetic force applied between wires during the electric discharge machining is canceled or reduced, sagging of a wire electrode is prevented, and thus it is possible to cut out a plurality of thin boards at a time with high precision in size.

Fourth Embodiment

In the first or second embodiment described above, machining liquid is ejected from the nozzle arranged in the vicinity of the workpiece to a machining portion. Therefore, the machining liquid ejected through the nozzle flows into the machined groove, a flow of the machining liquid is generated in the machined groove, and even when the machined groove becomes deeper, machining chips are discharged outside of the machined groove. Therefore, an excellent machining state is maintained. Although the ejecting operation of machining liquid into the machined groove by the nozzle is suitable for excellently maintaining the machining state, because the wire electrode runs in a longitudinal direction in a state where the wire electrode is wound around the guide rollers, it is necessary that the wire electrode passes through the nozzle. Therefore, a passing opening (an outlet) through which a wire passes needs to be formed not only in an ejection opening for machining liquid provided in a surface of the nozzle opposed to the workpiece, but also in a side of the nozzle opposite to the surface in which the ejection opening is formed. That is, when the nozzles are arranged on both sides of the workpiece, the wire electrode is inserted from the passing opening of one of the nozzles into this nozzle, pulled outside of the nozzle from the ejection opening and introduced into the machined groove, and thereafter the wire electrode is pulled out from the machined groove, introduced from the ejection opening of the other nozzle into this nozzle, and the wire electrode is pulled outside of the nozzle from the passing opening.

In such a configuration, when high pressure machining liquid is introduced into the nozzle to discharge the machining liquid into the machined groove, because the machining liquid is ejected not only from the ejection opening but also from the passing opening, the power of a pump cannot be effectively utilized. To avoid such a situation, the first embodiment has proposed to set the size of the passing opening as small as possible. However, when a configuration that many machined grooves are machined at the same time is employed for the sake of improving the productivity, because the number of winding times of the wire electrode is increased, not only the ejection opening but also the passing opening (the outlet) needs to be increased in size, a significant amount of machining liquid is ejected also from the passing opening (the outlet) and thus, a large-scaled machining liquid pump is required. Therefore, the first and second embodiments have room for improvement for enhancing the processing efficiency to perform many processes of slice machining at the same time.

As a pressure of machining liquid to be ejected from the ejection opening is increased, the machining liquid flows into a deeper side of the machined groove and a machining state is more stabilized, but when the machining liquid pressure is increased, high pressure machining liquid is ejected also from the passing opening. The passing opening of the nozzle is, in many cases, opposed to a power feed contact for feeding electricity to the wire electrode and a guide roller that guides a running state of the wire electrode. The power feed contact and the guide roller hold a wire electrode in grooves formed in their surfaces, and feed power or fixes the position of the wire electrode in many cases. However, when machining liquid ejected from the passing opening at a high pressure hits the wire electrode, the wire electrode vibrates and there is a possibility that a power feed failure or positional deviation of the wire electrode occurs. Therefore, in order to suppress the degradation in the shape precision of the machined groove and to suppress cracks of a thin board, particularly a thin board made of a hard and brittle material such as a semiconductor wafer, the first and second embodiments described above have room for improvement.

An object of a fourth embodiment is to improve these problems. A wire electric discharge machining apparatus according to the fourth embodiment includes a wire electrode having a plurality of cutting wire portions that are separated from each other in parallel and are opposed to a workpiece, a machining power supply that generates a pulsed machining voltage, a plurality of power feed contact units that are electrically connected to the cutting wire portions and apply the machining voltage between the cutting wire portions and the workpiece, and a nozzle that ejects machining liquid from an ejection opening toward an electrode gap along the cutting wire portions. The nozzle includes an ejection opening for ejecting the machining liquid and a plurality of slits arranged on a side opposite to the ejection opening, the cutting wire portions penetrate the nozzle through the ejection opening and the plurality of slits, and the nozzle includes a cutting-wire separating portion that forms the slits through which the plurality of cutting wire portions pass. Further, the cutting-wire separating portion is configured to close portions (all portions, for example) between the slits through which the cutting wire portions pass. The cutting-wire separating portion is made of a material that can be easily ground, such as machinable ceramics. The nozzle includes a machining-liquid outlet, in addition to the ejection opening and the slits, for discharging redundant machining liquid through the machining-liquid outlet.

Configurations and operations of the fourth embodiment are described below. A configuration of the wire electric discharge machining apparatus according to the fourth embodiment is shown in the perspective view of FIG. 1, similarly to the first embodiment. The four guide rollers 3a to 3d are separated from each other in parallel to the axial direction thereof. The wire electrode 2 unreeled from the wire bobbin 1 is sequentially wound for many times around the guide rollers 3a to 3d at a slight distance from each other, and then the wire electrode 2 is discharged from the wire discharge rollers 5. Portions of the wire electrode 2 that are extended in parallel to each other between the guide rollers 3a and 3b become the cutting wire portions 2a.

The workpiece 8 is opposed to the cutting wire portions 2a at a slight distance from each other, and a position control device (not shown) maintains this state. The machining power supply 6 is connected to the cutting wire portions 2a through the power feed contacts 7A and 7B, and the machining power supply 6 applies a voltage between the cutting wire portions 2a and the workpiece 8 that is separated at a slight distance from the cutting wire portions 2a, thereby generating electric discharge.

In this case, while the cutting wire portions 2a are constituted by wires extended around the guide rollers 3a and 3b in parallel, the machining power supply 6 is also constituted by a plurality of the machining power supply units 61 that are insulated from each other. Furthermore, the power feed contacts 7A and 7B are also constituted by a plurality of power feed contact units 71 that are insulated from each other. Machining power supply units 61 feed power to corresponding cutting wires through respective power feed contact units 71, and a voltage can be applied to the cutting wires independently.

Of course, like a conventional wire electric discharge machining apparatus, the polarity of a voltage applied by the machining power supply 6 can be appropriately reversed as needed.

As described above, the position control device (not shown) controls the position of the workpiece 8 such that it is always separated from the cutting wire portions 2a at a slight distance from each other so that an appropriate discharge gap with respect to the cutting wire portions 2a is maintained. Therefore, as the machined groove is formed by the electric discharge, the workpiece 8 is gradually sent toward the cutting wire portions 2a, the machined groove becomes deeper and the workpiece 8 is eventually cut into a thin board shape.

It is necessary to slice the workpiece 8 into a plurality of thin boards, and examples of the workpiece 8 include metal such as tungsten and molybdenum that become sputtering targets, ceramic such as polycrystalline silicon carbide used as various structural members, a semiconductor material such as at least one of monocrystalline silicon and monocrystalline silicon carbide that become semiconductor device wafers, and a solar battery material such as monocrystalline and polycrystalline silicon that become solar battery wafers. The semiconductor material can be made of a material having at least one of silicon and silicon carbide as the main component thereof.

FIG. 1 depicts that one wire electrode 2 is wound around the four guide rollers as an example; however, the present invention is not limited thereto, and if a plurality of cutting wire portions are formed from one wire electrode 2, the specific configuration is not particularly limited. The power feed contact can be separated from the cutting wire portions 2a at a slight distance therefrom through the guide roller 3b like the power feed contact 7A, or can be arranged in the vicinity of the workpiece between the workpiece 8 and the guide roller 3a.

Figure 13A:
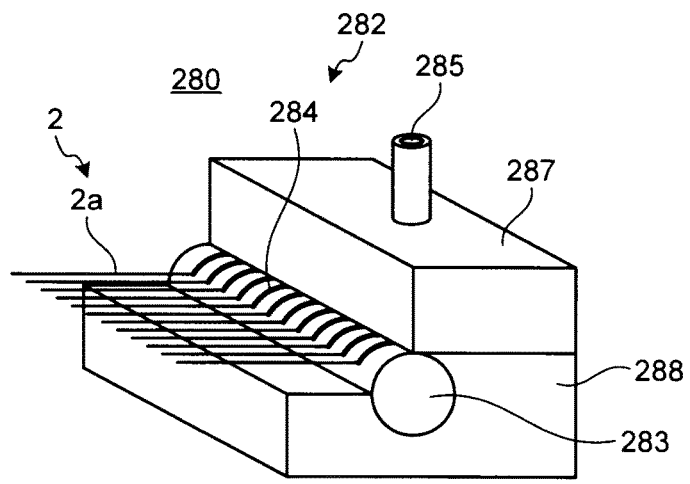
FIG. 13 is an explanatory diagram of a structure of a nozzle according to a fourth embodiment.
Figure 13B:
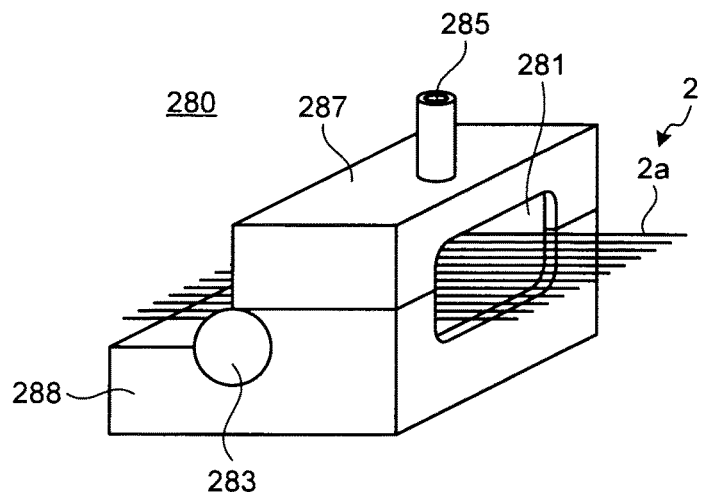
Figure 13C:
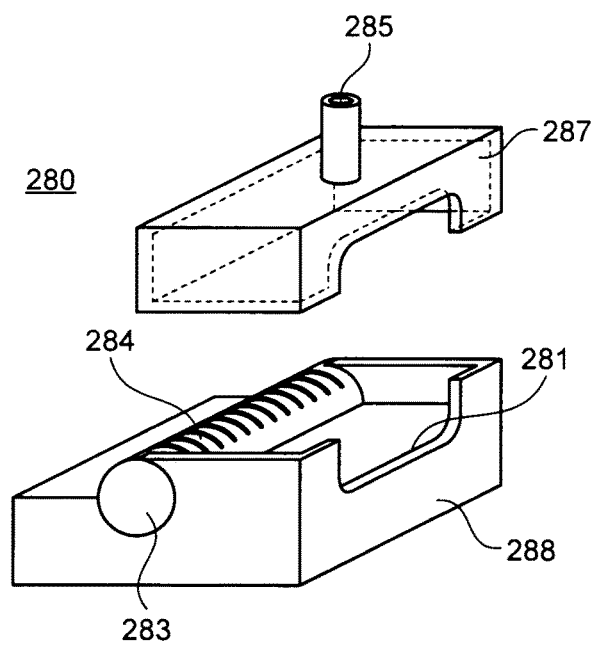
Figure 14:
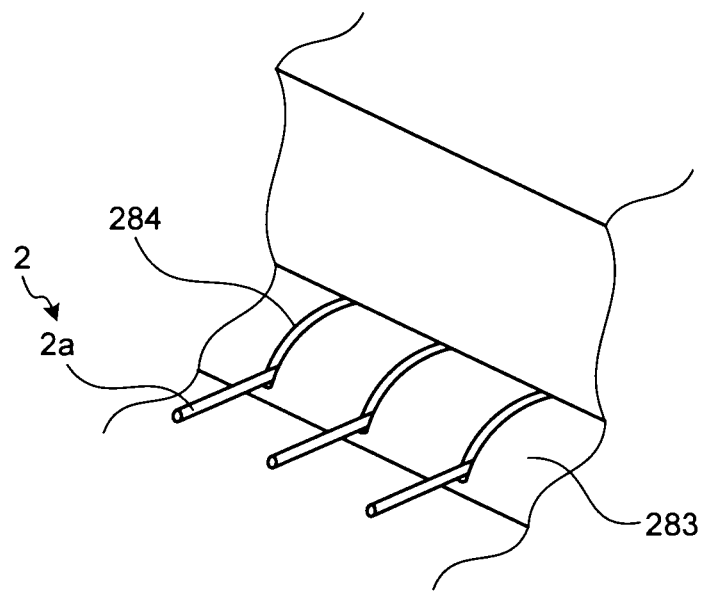
FIG. 14 is a detailed explanatory diagram of a positional relation among a wire separating portion, separation slits, and a wire according to the fourth embodiment.
Figure 15:
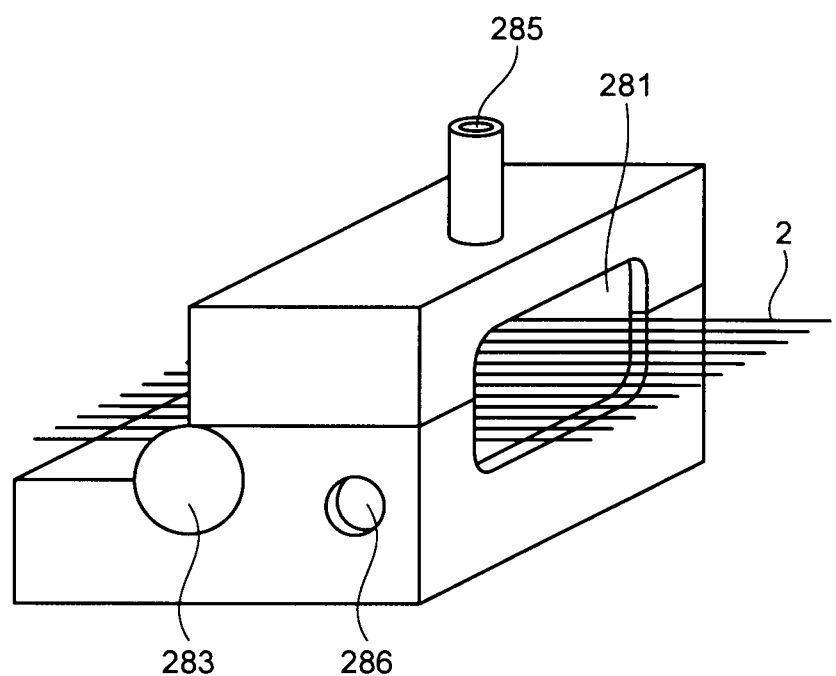
FIG. 15 is an explanatory diagram of a machining-liquid discharging opening according to the fourth embodiment.

To eject machining liquid to the machined groove, a nozzle 280 is arranged adjacent to the workpiece 8, and because this is the main configuration of the present embodiment, this configuration is described in detail with reference to FIGS. 13 and 14. FIG. 13 is an explanatory diagram of a structure of the nozzle 280 according to the fourth embodiment, where FIG. 13(a) is a perspective view of an external appearance of the nozzle 280 on the side of a passing opening 282, FIG. 13(b) is a perspective view of the external appearance of the nozzle 280 on the side of an ejection opening 281, and FIG. 13(c) depicts a state where a lid 287 is separated from a base 288 and a wire separating portion 283. FIG. 14 is a detailed explanatory diagram of a positional relation among the wire separating portion 283, separation slits 284, and the wire electrode 2 according to the fourth embodiment. FIG. 15 is an explanatory diagram of a machining-liquid outlet 286 according to the fourth embodiment.

The nozzles 280 are arranged on both sides of a workpiece, and the wire electrode 2 having the cutting wire portions 2a penetrated inside the nozzles 280. That is, the ejection opening 281 is formed in the surface of each of the nozzles 280, which is opposed to the workpiece, and the passing opening 282 is formed on a side opposite to the ejection opening 281. The passing opening 282 includes a plurality of the separation slits 284. Therefore, the cutting wire portions 2a are introduced into the passing opening 282 (the separation slits 284) of one of the nozzles 280, thereafter pulled out from the nozzle 280 through the ejection opening 281, and introduced into the machined groove, pulled out from the machined groove, and then the cutting wire portions 2a are introduced from the ejection opening 281 of the other nozzle 280 into the nozzle 280, and are pulled out from the nozzle 280 through the passing opening 282 (the separation slits 284).

Furthermore, as shown in FIG. 13, the cutting-wire separating portion 283 is provided at the passing opening 282 (the separation slits 284) arranged on a side opposite to the ejection opening 281. The separation slits 284 are formed in the cutting-wire separating portion 283 at a certain distance from each other, and the distance is substantially the same as the interval of the wire electrode 2. As shown in FIG. 14, the cutting wire portions 2a pass through the corresponding separation slits 284. Therefore, the cutting wire portions 2a are introduced into one of the nozzles 280 through the separation slits 284 formed in the wire separating portion 283 of this nozzle 280, the cutting wire portions 2a are pulled out from the nozzle 280 through the ejection opening 281, introduced into the machined groove, and pulled out from the machined groove, and introduced into the other nozzle 280 from the ejection opening 281 of this nozzle 280, and the cutting wire portions 2a are pulled out from the nozzle 280 through the separation slits 284 formed in the wire separating portion 283.

Because the wire electrode 2 having the cutting wire portions 2a passes through the respectively corresponding different separation slits 284 in the wire separating portion 283, portions of the nozzle 280 between the cutting wire portions 2a that are arranged in parallel to each other are closed. Therefore, the opening area of the passing opening 282 (the separation slits 284) is largely reduced.

Machining liquid is pressurized by a pump (not shown), the machining liquid is introduced into the nozzle 280 through a pipe (not shown) and a pipe connection hole 285 formed in the nozzle 280, ejected from the ejection opening 281 toward the workpiece 8 and the machined groove, and is ejected at the same time to outside through the separation slits 284 formed in the wire separating portion 283 arranged in the passing opening 282.

Like the first embodiment, the wire separating portion 283 is not arranged on the ejection opening 281, and the cutting wire portions 2a are led into the one ejection opening 281. Therefore, a pressure loss is reduced on the side of the ejection opening and a sufficient pressure and a sufficient flow rate can be secured even when the cutting wire portions 2a are arranged adjacent to each other.

As described above, according to the configuration of the fourth embodiment, the cutting-wire separating portion 283 is provided on a side opposite to the ejection opening 281, the separation slits 284 are formed in the cutting-wire separating portion 283 at a certain distance from each other, the distance is substantially the same as the interval of the cutting wire portions 2a that are arranged substantially in parallel to each other, and the cutting wire portions 2a pass through the corresponding separation slits 284. According to this configuration, it is possible to largely reduce the opening area of the passing opening 282 (the separation slits 284), and it is possible to suppress an amount of machining liquid ejecting from a side opposite to the ejection opening 281 (on the side of the passing opening 282) when machining liquid introduced into the nozzle 280 is ejected from the ejection opening 281 to the machined groove. Therefore, it is possible to effectively utilize the power of the machining liquid booster pump, to reduce a machining liquid flow that ejects from the passing opening 282 under a high pressure and hits the power feed contact and the guide roller, to reduce vibrations of the cutting wire portions, and to prevent a power feed failure and positional deviation of the wire caused by vibrations of the wire. As a result, it is possible to improve the machining precision of the machined groove, and to prevent a thin board, particularly a thin board made of a hard and brittle material such as a semiconductor wafer from being bent and damaged.

Although the separation slits 284 are formed in the wire separating portion 283 in advance and the cutting wire portions 2a pass through the separation slits 284 in the above embodiments, it is possible to employ a configuration that the wire separating portion 283 is arranged by using a material that can be easily ground, such as machinable ceramics, without forming the separation slit 284, and the wire separating portion is ground by running of the cutting wire portions 2a along with an operation of the wire electric discharge machining apparatus, thereby to automatically form the separation slits 284. In this case, time and labor for forming the separation slits 284 in advance can be omitted.

In the above embodiments, to suppress the machining liquid ejecting from the passing opening 282, it is preferable that the wire separating portion 283 closes all portions of the nozzle 280 between the separation slits 284, and all machining liquid passing on a side opposite to the ejection opening 281 (on the side of the passing opening 282) passes through the separation slits 284. In this configuration, if there is a risk that a pressure becomes excessively high when the ejection opening 281 and the workpiece are brought into tight contact with each other, it is possible to employ a configuration that an opening is formed in a portion of the wire separating portion 283 for leaking redundant machining liquid on a side opposite to the ejection opening 281 (on the side of the passing opening 282) when necessary, so that a portion of the redundant machining liquid does not pass through the separation slits 284, but is discharged from the opening through which the machining liquid leaks.

As shown in FIG. 15, the nozzle 280 further includes the machining-liquid outlet 286, and redundant machining liquid other than that from the ejection opening 281 is discharged mainly from the machining-liquid outlet 286 instead of the passing opening 282. According to this configuration, it is possible to avoid a risk that a machining liquid pressure is increased needlessly, and to lower the possibility that high pressure machining liquid hits the power feed contact and the guide roller and then a wire is vibrated.

According to the fourth embodiment, machining liquid can efficiently eject from the ejection opening, a necessary and sufficient machining-chip discharging effect can be exhibited by using a small capacity pump, and it is possible to realize a large number of parallel slice machining without generating a power feed failure or positional deviation. It is possible to effectively utilize power of the machining-liquid booster pump. Time and labor for forming the slits in a wire separating portion in advance can be omitted. It is possible to avoid a risk that a machining liquid pressure is increased needlessly, and to avoid a case where high pressure machining liquid hits the power feed contact and the guide roller and then a wire is vibrated.

Figure 16:
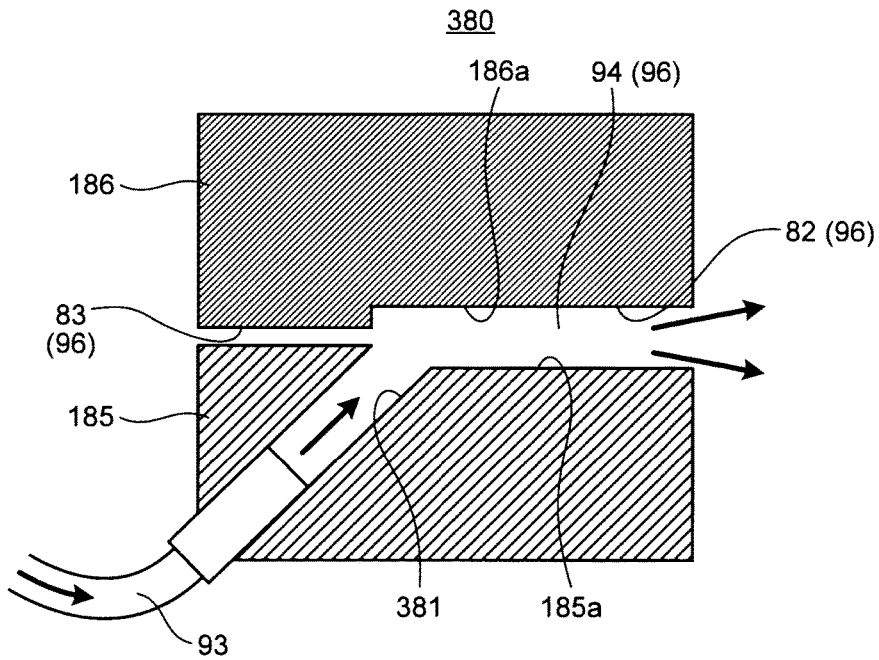
FIG. 16 is an explanatory diagram of a cross sectional structure of a machining liquid nozzle according to a modification of the first to fourth embodiments.
Figure 17:
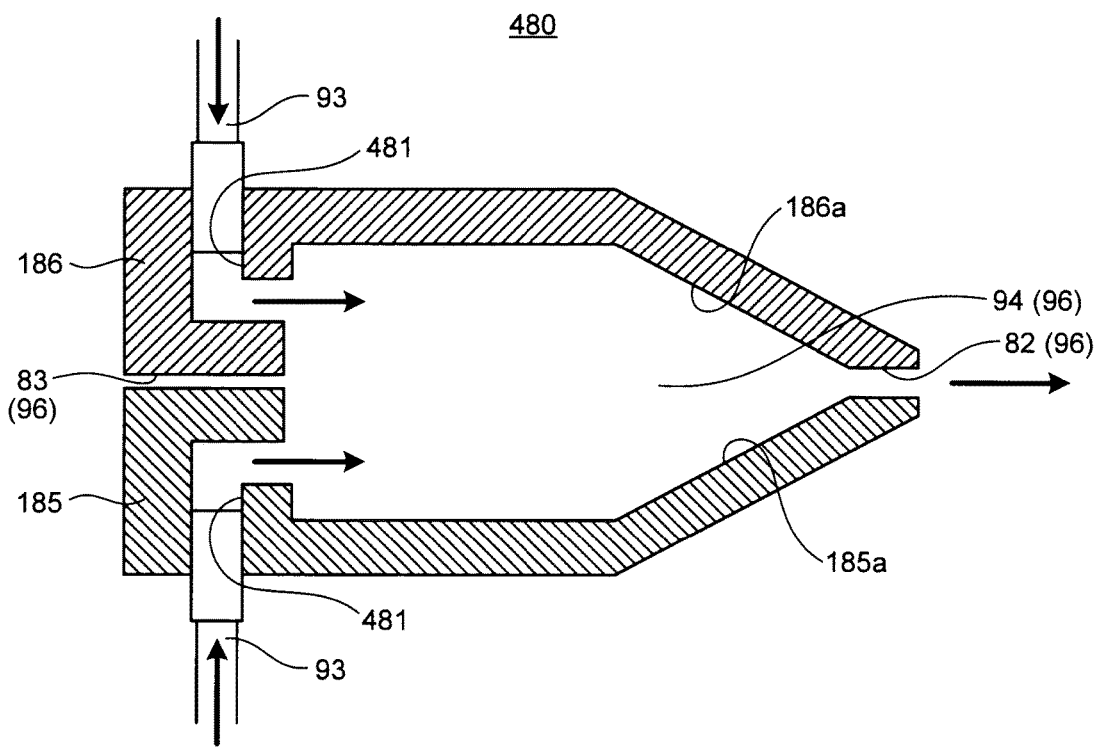
FIG. 17 is an explanatory diagram of a cross sectional structure of the machining liquid nozzle according to the modification of the first to fourth embodiments.

A nozzle shown in FIG. 16 or 17 can be used instead of the nozzles described in the first to fourth embodiments. FIGS. 16 and 17 are sectional views of cross sectional structures of the nozzles according to a modification of the first to fourth embodiments.

In the case of the nozzle 180 having the cross sectional shape according to the second embodiment shown in FIG. 8, when machining liquid flows from the supply pipe 93 into the nozzle 180 through the pipe connecting hole 81, the machining liquid that flows into the nozzle 180 hits the opposed surface 186a in the nozzle 180 and scatters. Therefore, machining liquid flows not only into the ejection opening 82 but also into the outlet 83 easily. The purpose of providing the nozzles according to the first to fourth embodiments is to inject machining liquid into an electrode gap during the wire electric discharge machining, and when machining liquid is discharged from the outlet 83, because the liquid pressure of the machining liquid is reduced, there is a possibility that an amount of machining liquid from the ejection opening 82 to which it is desired to supply the machining liquid is reduced.

On the other hand, as shown in FIG. 16 or 17, an exit hole of a pipe connecting hole 381 or 481 oriented to the through hole 96 in a nozzle 380 or 480 is oriented in a direction opposite to the outlet 83 for machining liquid, and is oriented toward the ejection opening 82. That is, according to the nozzle 380 or 480 shown in FIGS. 16 and 17, machining liquid that flows into the nozzle 380 or 480 through the supply pipe 93 flows into the through hole 96 in the nozzle 380 or 480 through the nozzle 380 or 480 (the pipe connecting hole 381 or 481), and a flow path through which machining liquid flows from the nozzle 380 or 480 to the through hole 96 is oriented toward the ejection opening 82.

More specifically, according to the nozzle 380 shown in FIG. 16, the flow path through which machining liquid flows into the through hole 96 obliquely extends such that the flow path approaches the ejection opening 82 as approaching the through hole 96. In other words, a central axis of a portion of the pipe connecting hole 381 through which machining liquid flows into the through hole 96 obliquely extends such that the flow path approaches the ejection opening 82 as approaching the through hole 96.

According to the nozzle 480 shown in FIG. 17, two flow paths through which machining liquid flows into the through hole 96 extend in a direction (for example, in a direction substantially in parallel to a central axis of the through hole 96) extending along the central axis of the through hole 96 at respective positions shifted from the central axis of the through hole 96. In other words, the central axes of the portion of the two pipe connecting holes 481 through which machining liquid flows into the through hole 96 are shifted from the central axis of the through hole 96, and extend in a direction (for example, in a direction substantially in parallel to the central axis of the through hole 96) extending along the central axis of the through hole 96. Two central axes of portions of the two pipe connecting holes 481 through which machining liquid flows into the through hole 96 are located symmetrically with respect to the central axis of the through hole 96. According to this configuration, it becomes easier to equalize a machining liquid pressure applied to the cutting wire portions 2a.

Accordingly, machining liquid that flows into the nozzle 380 or 480 positively flows toward the ejection opening 82, and it is possible to largely reduce an amount of machining liquid that reversely flows toward the outlet 83. According to the nozzle that changes a supply path of machining liquid toward the through hole 96 in the nozzle 380 or 480, it is possible to efficiently supply machining liquid to the electrode gap during the electric discharge machining.

According to the present modification, it is possible to increase an amount of machining liquid discharged from the ejection opening and to reduce an amount of machining liquid discharged from the outlet. Even a small capacity pump can exhibit a necessary and sufficient machining chip discharging effect, and it is possible to realize a large number of parallel slice machining without generating a power feed failure or positional deviation. It is possible to effectively utilize power of the machining-liquid booster pump. It is also possible to avoid a case where high pressure machining liquid hits the power feed contact and the guide roller and then a wire is vibrated.

INDUSTRIAL APPLICABILITY

As described above, the wire electric discharge machining apparatus according to the present invention is useful for manufacturing thin boards, and is suitable for manufacturing semiconductor materials and solar battery materials that require high precision in size.

REFERENCE SIGNS LIST

1 WIRE BOBBIN
2 WIRE ELECTRODE
2a CUTTING WIRE PORTION
2b FEED WIRE PORTION
3a, 3b, 3c, 3d GUIDE ROLLER
5 WIRE DISCHARGE ROLLER (REEL BOBBIN)
6 MACHINING POWER SUPPLY
7A, 7B POWER FEED CONTACT
8 WORKPIECE
61 MACHINING POWER SUPPLY UNIT
71, 72 POWER FEED CONTACT UNIT
80 NOZZLE
80a RECESS
80b GROOVE
81 PIPE CONNECTING HOLE

81a INLET
81b EXIT
82 EJECTION OPENING
83 OUTLET
84 BODY
85 PLUG
91 EJECTION OPENING CONFIGURING BOARD
91a NOTCH
92 OUTLET CONFIGURING BOARD
92a NOTCH
93 SUPPLY PIPE
94 WIRE THROUGH HOLE
95 O-RING
96 THROUGH HOLE
97 STAGE
180 NOZZLE
184 BODY
185 BASE
185a OPPOSED SURFACE
185b GROOVE
186 LID
186a OPPOSED SURFACE
280 NOZZLE
281 EJECTION OPENING
282 PASSING OPENING
283 WIRE SEPARATING PORTION
284 SEPARATION SLIT
285 PIPE CONNECTION HOLE
286 MACHINING-LIQUID OUTLET
380 NOZZLE
381 PIPE CONNECTING HOLE
480 NOZZLE
481 PIPE CONNECTING HOLE

The invention claimed is:

1. A wire electric discharge machining apparatus, comprising:
    a single wire electrode having a plurality of cutting wire portions;
    a plurality of power feed contact units that are electrically connected to the cutting wire portions to apply a machining voltage between the cutting wire portions and the workpiece;
    a machining power supply for generating the machining voltage between the cutting wire portions electrically connected to the plurality of power feed contact units and the workpiece;
    two nozzles, wherein the plurality of cutting wire portions extend between said two nozzles, to be set opposing to the workpiece; and
    guide elements,
    wherein the wire electrode is continuous looped around plural guide elements while placed in and out of the nozzles multiple times to allow the plurality of wire cutting portions to traverse simultaneously the longitudinal axis of the multiple nozzles and the guide elements,
    wherein each nozzle comprises:
    a body;
    first and second recesses formed in the body;
    an ejection opening element in the first recess, the ejection opening element comprising a pair of members in the first recess and forming notches facing each other, the notches jointly defining an ejection opening facing the workpiece;
    an outlet element in the second recess, the outlet element comprising a pair of members forming an outlet;
    a wire through hole formed in the body and communicating with both the ejection opening and the outlet;
    first and second vertically extending passageways defined in the body and intersecting the wire through hole perpendicularly thereto, the first passageway having an upper open end communicating with the wire through hole and a lower open end for connection to a supply pipe for supplying a machining liquid, the second passageway having an upper closed end and a lower open end communicating with the wire through hole and; and
    O-rings,
    wherein the first and second recesses have grooves formed therein, the grooves surrounding the wire through hole, the O-rings fit in the grooves to provide liquid tight seals between the body and the ejection opening element and between the body and the outlet element,
    wherein the ejection opening, the outlet, and the wire through hole jointly define a through hole, the through hole allowing the plurality of cutting wire portions of the wire electrode to extend through the through hole together in parallel to one another, the cutting wire portions being mutually spaced from one another in a direction transverse to the extension of the cutting wire portions through the through hole,
    wherein the through hole and the first passageway cooperate to allow the machining liquid from the supply pipe to flow through the first passageway and then flow in a direction deviated by 90 degrees so that the liquid flows from the first passageway into the wire through hole and is ejected from the ejection opening for ejection of the machining liquid to the workpiece in the direction of the extension of the cutting wire portions of the wire electrode through the through hole,
    wherein the ejection openings of both of the two nozzles face one another such that the workpiece accommodated between the nozzles is accommodated between the respective one ends of the two nozzles,
    wherein each of the ejection openings and the outlet of each nozzle has a width and a height smaller than the width, the width extending in the direction transverse to the extension of the cutting wire portions of the wire electrode and being sufficient to allow the cutting wire portion to extend through the through hole, and an area of the ejection opening is larger than that of the outlet and the height of the ejection opening is larger than the height of the outlet.

2. The wire electric discharge machining apparatus according to claim 1, wherein the body, the ejection opening element, and the outlet element are separated at a plane parallel to the direction in which the plurality of cutting wires are mutually spaced from one another.

3. The wire electric discharge machining apparatus according to claim 1, wherein the lower end of the first passageway is a machining liquid supply hole through which the machining liquid is supplied into the respective nozzle in a direction intersecting the direction in which the cutting wire portions extending through the through hole of the respective nozzle are mutually spaced from one another.

4. The wire electric discharge machining apparatus according to claim 1, wherein the two nozzles are horizontally spaced from each other.

* * * * *